Oct. 14, 1924.                                                                          1,511,902
                              J. MUGLER ET AL
                    SUBMARINE BOAT WITH STEAM AS DRIVING POWER
                         Filed Dec. 3, 1921          6 Sheets-Sheet 1
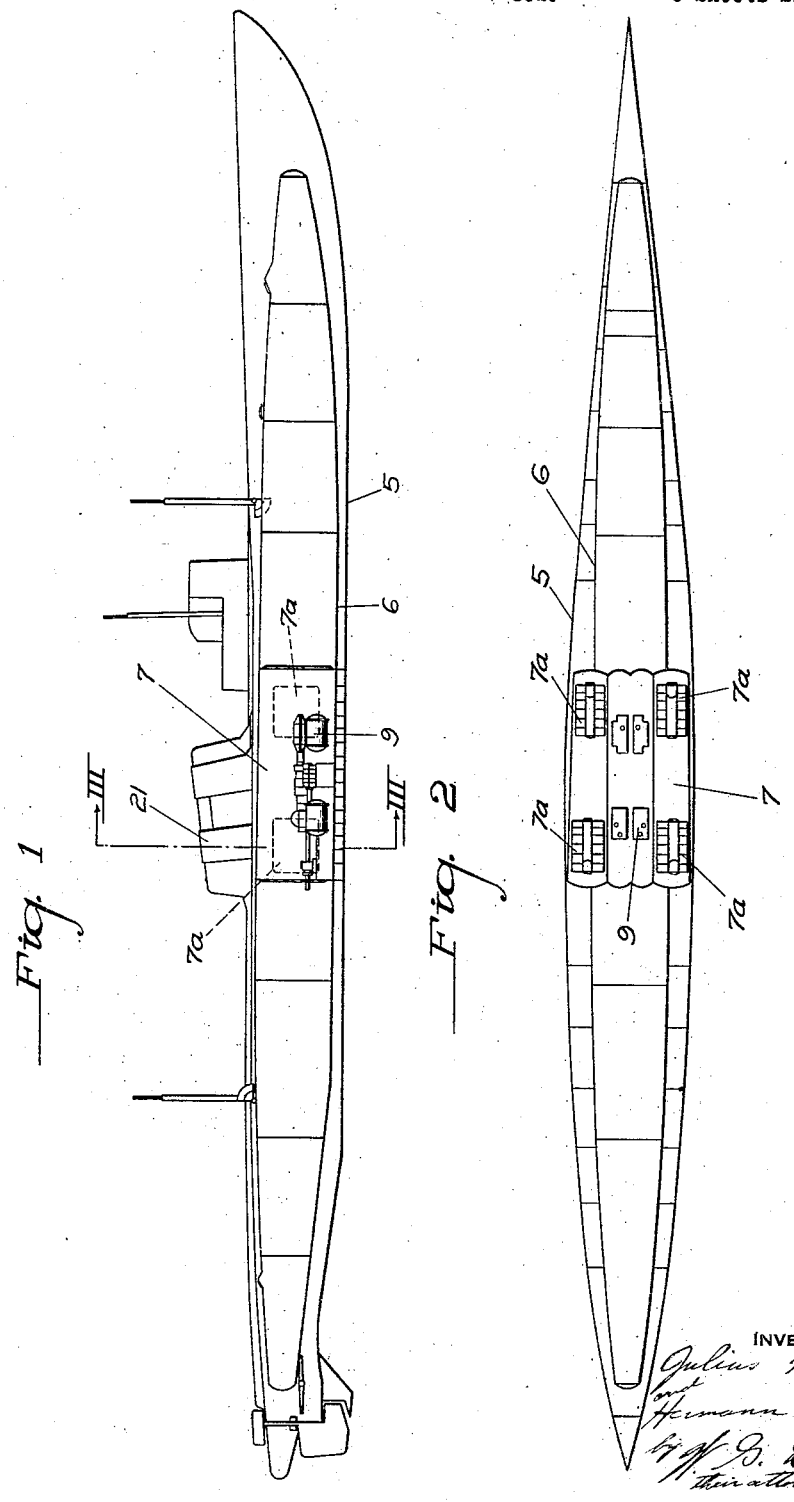

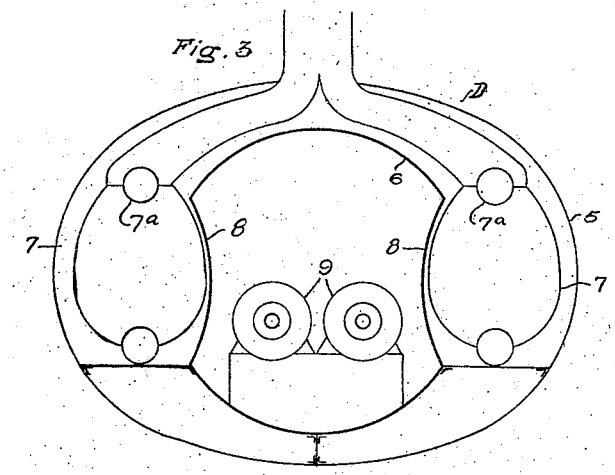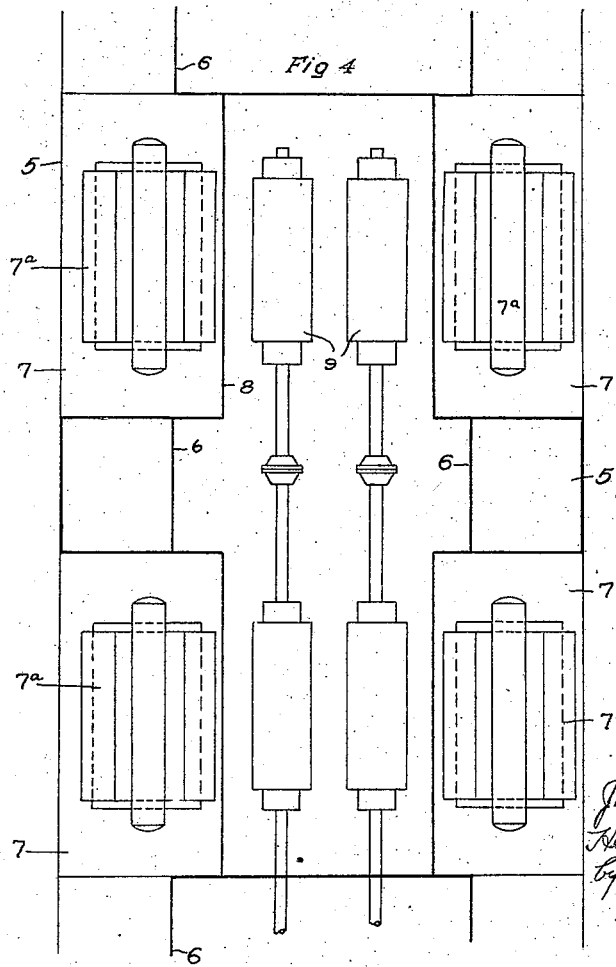

Oct. 14, 1924.   1,511,902
J. MUGLER ET AL
SUBMARINE BOAT WITH STEAM AS DRIVING POWER
Filed Dec. 3, 1921   6 Sheets-Sheet 3

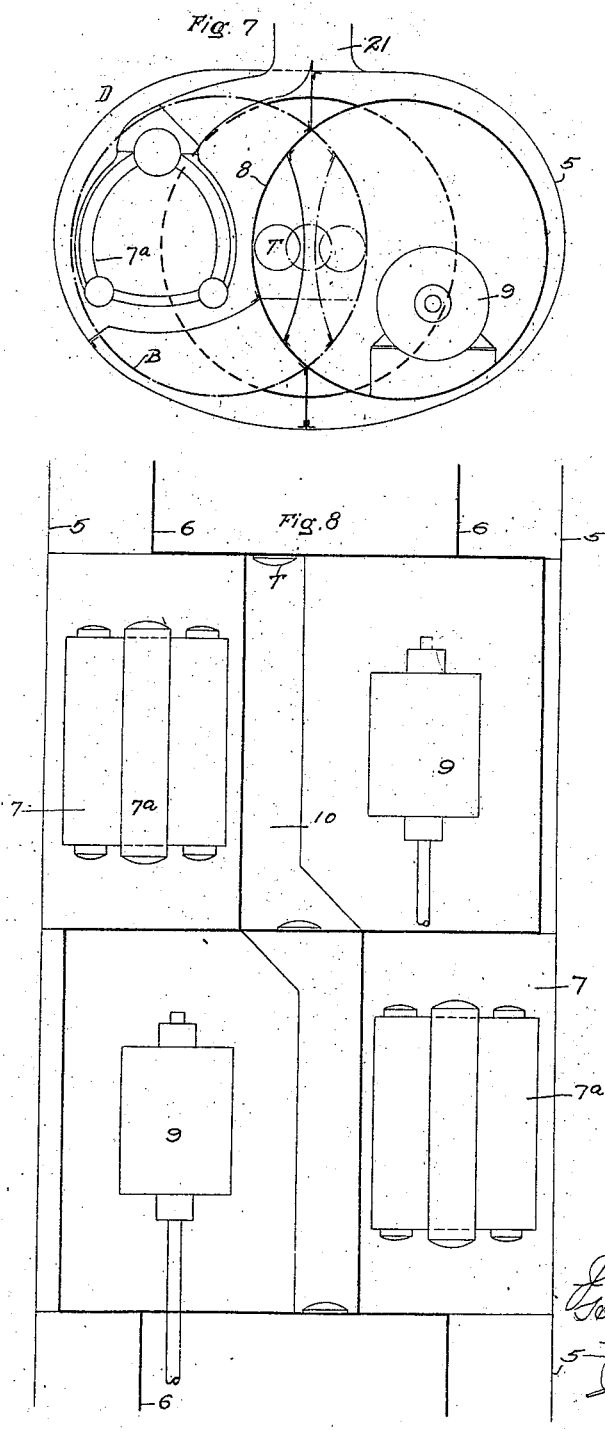

Oct. 14, 1924.

J. MUGLER ET AL 1,511,902

SUBMARINE BOAT WITH STEAM AS DRIVING POWER

Filed Dec. 3. 1921    6 Sheets-Sheet 5

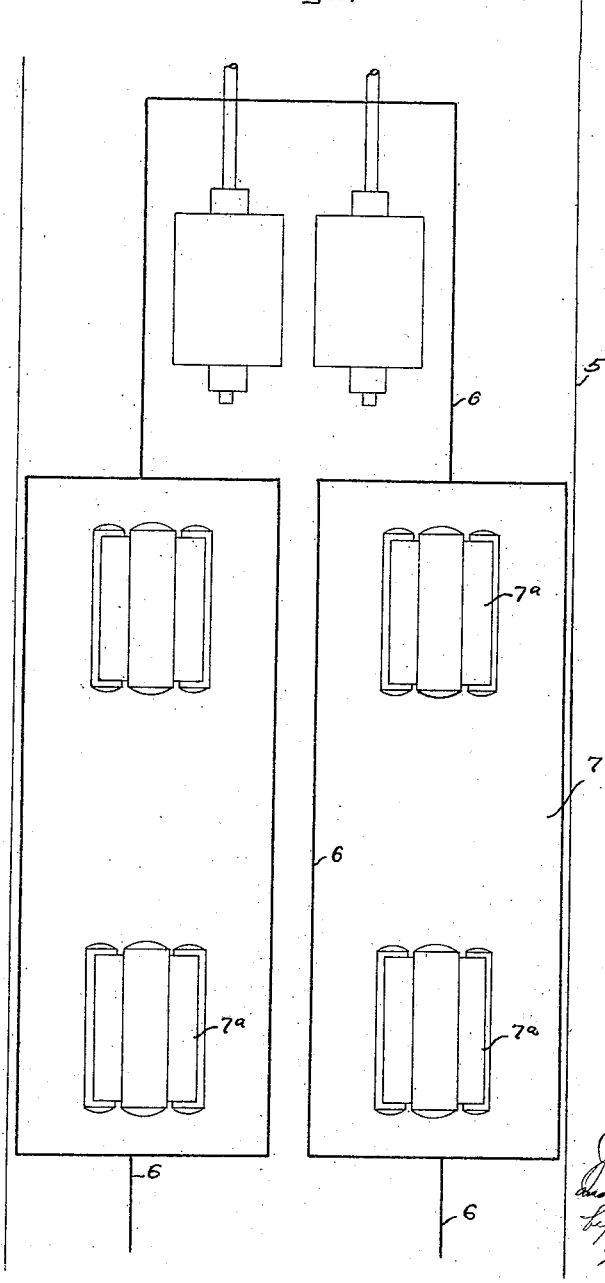

Patented Oct. 14, 1924.

1,511,902

UNITED STATES PATENT OFFICE.

JULIUS MUGLER, OF BERLIN, AND HERMANN WÖLKE, OF BREMEN, GERMANY.

SUBMARINE BOAT WITH STEAM AS DRIVING POWER.

Application filed December 3, 1921. Serial No. 519,607.

*To all whom it may concern:*

Be it known that we, JULIUS MUGLER and HERMANN WÖLKE, citizens of Germany, residing at Berlin, Germany, and Bremen, Germany, respectively, have invented certain new and useful Improvements in Submarine Boat with Steam as Driving Power, of which the following is a specification.

This invention is for a submarine boat, and relates particularly to the construction and disposal of a steam power unit therefor.

The higher speeds obtainable from steam operated power plants for submarines over the more common internal combustion engine type of power unit is recognized by those skilled in the art. However, considerable difficulty is encountered in the disposition of the steam generators so as not to necessitate an increase in the overall length of the craft, or so as not to require additional room needed for other purposes. Another source of difficulty is the insulation of heat and the protection of the crew from the effects of heat radiating or conducted from the generators.

The present invention has for its principal objects to provide a power unit in a submarine vessel having a storage capacity for the conservation of steam for use in underwater cruising.

Another important object of the invention is to provide a novel arrangement of the steam generators with respect to the construction of the boat so as to reduce the interior space of the vessel occupied by the steam generators to a minimum, so that very little useful space is required for them, without reducing their size to a point where they are inefficient or uneconomical.

Another important object of the invention is to so arrange the steam generators as to overcome, to a great extent, the radiation or conduction of heat to adjoining parts of the vessel, and to provide means for cooling heat radiating surfaces.

These and other objects and advantages are attained by my invention which is illustrated in the accompanying drawings, all of which are diagrammatic views. In the drawings:

Fig. 1 represents a longitudinal vertical section through a submarine boat embodying our invention;

Fig. 2 is a horizontal section of the vessel;

Fig. 3 is a transverse section in the plane of line III—III of Fig. 1;

Fig. 4 is a plan view of the power unit arrangement, as shown in Fig. 2, but on a larger scale;

Fig. 7 is a transverse vertical section corresponding to Fig. 3, showing a staggered arrangement for the generators and turbine;

Fig. 8 is a plan view of the arrangement shown in Fig. 6;

Fig. 11 is a plan view of another arrangement.

Figure 5:
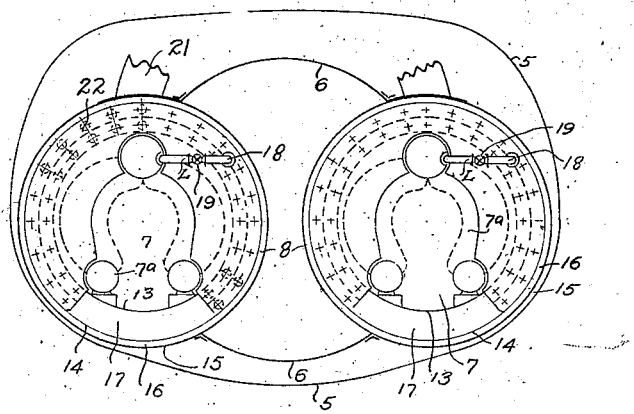
Fig. 5 is a view generally similar to Fig. 3, but illustrating high pressure generators instead of the low pressure generators of Fig. 3.

In the drawings, 5 designates the outer shell of a submarine boat of accepted design, within which is the inner or pressure resisting hull 6, the latter being in spaced relation to the former.

Intermediate the ends of the boat, preferably amidships thereof, are steam generator or boiler rooms or compartments 7, which are between the inner and outer hulls, the rooms projecting laterally from the inner or pressure resisting hull. It is generally preferable to so shape the inner hull that the wall along the inside of the generator room will bulge or bow inwardly, as indicated at 8, thus occupying some of the space within the interior of the hull. In each generator room are one or more boilers 7ª.

Figure 9:
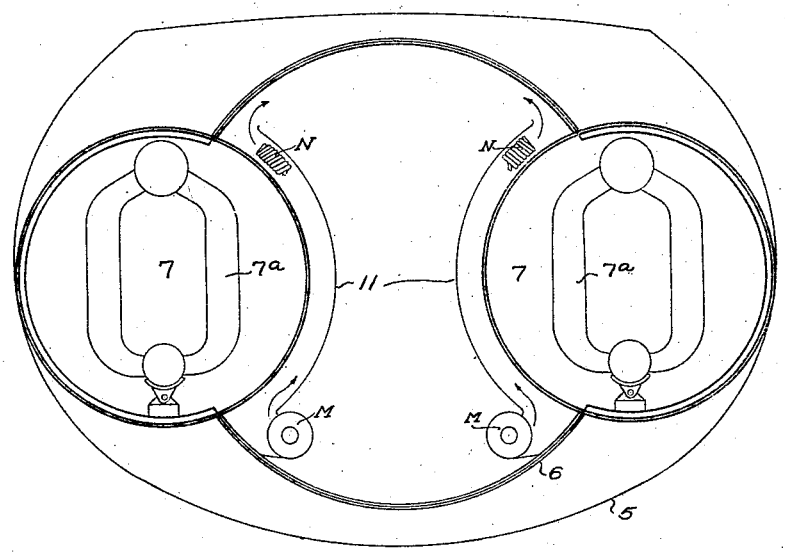
Figs. 9 and 10 are other transverse sections illustrating further modifications, including the provision of cooling means.
Figure 10:
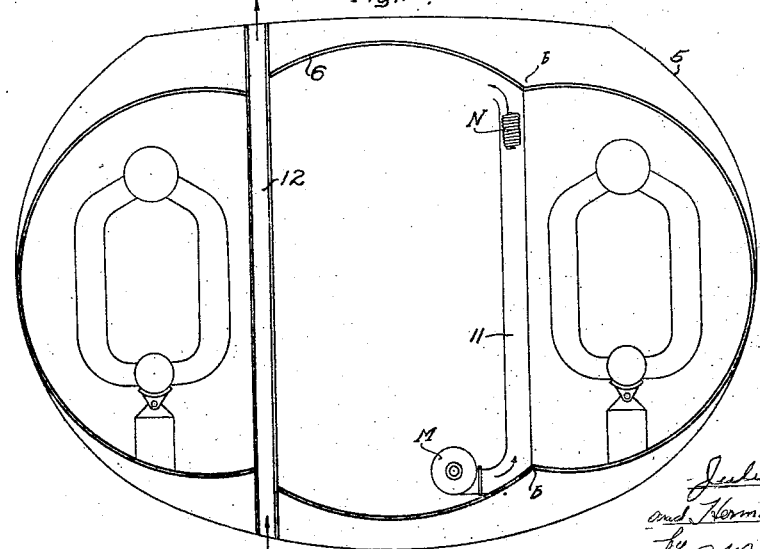

The engines or turbines 9 may be located between the generators, as shown for instance in Figs. 3 and 4, or may be at one end of the generator rooms, as shown in Fig. 11. At least two generators are generally employed, and four are preferable, but they are so disposed as to balance each other, preferably being arranged in pairs, as clearly shown in Fig. 4 of the drawings, one for one side being athwart the corresponding one on the other side.

Where only two generators are used, they may be staggered with relation to each other, the engines or turbines also being staggered, as shown in Figs. 8 and 9. This arrangement permits of a communicating aisle 10 from one end of the ship to the other through the boiler and engine rooms. However, in no case do the generator rooms extend so far into the inner hull as to meet and cut off communication fore and aft thereof.

Where the wall of the steam generator room is close to or common with the pressure resisting hull 6, so that heat would radiate therefrom into the hull, a partition 11 may be placed inside the ship, as shown in Figs. 9 and 10, and air forced up over the hot wall by a ventilator fan M. This air, before being returned to the interior of the vessel, may be cooled by coils N, through which sea water may flow. In Fig. 10 it will be noted that the rooms do not bulge into the inner hull, but are straight, but they do curve outwardly.

Instead of utilizing air for cooling purposes, one or more vertically extending cooling passages 12 may be provided, as shown in Fig. 10, so that water may circulate therethrough.

In the event that steam is to be utilized only for surface crusing, the generators may be of a low pressure type and may be flooded when the vessel submerges, thereby not taking up any of the desired space between the two hulls needed for water ballast.

Figure 6:
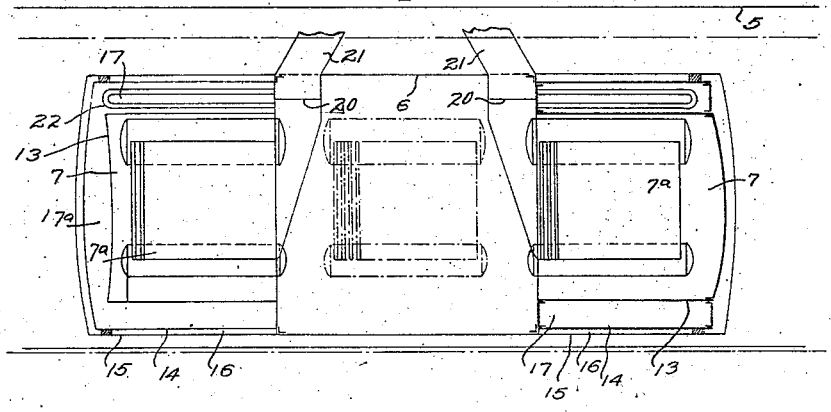
Fig. 6 is a longitudinal section in the plane of line V—V of Fig. 4, the dotted line representation indicating the removability of the generators from the housings in which they are contained.

Where, however, steam is to be stored, for under water cruising, special high pressure generators may be employed, as shown in Figs. 5 and 6. In these views, the generators, designated 7ª, as in the other views, are enclosed in a casing B surrounded by a second shell 14 which is spaced from the inner shell. Spaced outside this shell, is a casing 15 that may be common, in part, to the inner hull 6 of the vessel. The space 16 between shells 14 and 15 is evacuated to provide heat insulation.

The space 17 between shells 13 and 14 is a steam chamber which communicates with the steam generator 7 through a pipe 18 in which is a manually operable valve 19. Inasmuch as the steam reservoirs or conservors immediately surround the steam generator, they are kept hot by the excess heat from the generator. To further heat the space, a baffle 20 may be placed in the flues 21 for directing the hot gases of combustion through U-shaped tubes 22 disposed in the space 17, and having their opposite ends opening into the flue on opposite sides of the baffle.

In the event that the space 17 is not sufficient, and to increase the underwater cruising range, space 17ª, see Fig. 6, at the end of the generator may be utilized for steam storage.

In operation, where steam is used for underwater cruising, the steam flows through pipe 18 back into the generators, where it passes through the usual conduits, not shown, to the turbines. This simplifies the necessary arrangement of pipes and valves, and simplifies the operation when making a changeover.

The compartments for the high pressure generators are spaced apart longitudinally, as shown in Fig. 6. The high pressure generator units may be provided with removable end plates, so that, when necessary, the generator can be removed from the inner shell when the end plate is removed, and brought into the space between the two generators, as shown in Fig. 7, for repairs.

The drawings are to be considered merely as illustrative of the invention, and various details of construction and arrangement may be modified within the contemplation of the invention and under the scope of the appended claims.

We claim as our invention:

1. A submarine boat with steam generator compartments formed on each side of the pressure resisting hull near the longitudinal center and externally of said pressure resisting hull, and extending laterally therefrom, and means for cooling the wall common to both the compartments and the hull, said means comprising ducts through which a cooling medium is circulated in contact with said wall.

2. A submarine boat having an outer hull and an inner pressure-resisting wall; said boat being laterally expanded near the longitudinal center section to form side steam generator compartments and a central working compartment; said boat having air cooling ducts between the central and side compartments, through which ducts-cooled air is circulated.

3. A submarine boat having outer and inner hulls, and steam generating rooms disposed substantially amidships in the space between the inner and outer hulls, said inner hull being bowed inwardly where such rooms are provided to give a substantial increase in the size of said rooms, and steam generators in the rooms.

4. A submarine boat having spaced-apart outer and inner hulls, steam generating rooms between the hulls and disposed athwart each other, said rooms being bowed outwardly into the inner hull, a central passageway in the hull between the bowed-out portion of the rooms, and generators in the rooms.

5. A submarine boat having spaced apart outer and inner hulls, two steam generating rooms between the hulls at each side of of the ship near the center thereof, one room being spaced forwardly of the other, the corresponding rooms on each side being substantially athwart those on the other side, and steam generators removably carried in each room, the longitudinal space between the two rooms on each side being sufficient to receive one of the generators when removed.

6. A submarine boat having spaced apart outer and inner hulls, two steam generating rooms between the hulls at each side of the ship near the center thereof, one room being spaced forwardly of the other, the corresponding rooms on each side being substantially athwart those on the other side, and steam generators removably carried in each room, the longitudinal space between the two rooms on each side being sufficient to receive one of the generators when removed, said generator rooms being bowed outwardly into the inner hull, and a central passage in the hull between the rooms.

7. A submarine boat with an outer and an inner hull, and steam generator compartments at each side of the inner hull and projecting laterally outwardly of said inner hull, said inner hull being bowed inwardly to increase the available size of the compartments.

8. A submarine boat having inner and outer hulls, and boiler rooms extending laterally beyond the inner hull in the space between the two shells, the boiler rooms being outwardly rounded.

In testimony whereof we have affixed our signatures.

JULIUS MUGLER.
HERMANN WÖLKE.